J. F. COOK.
BOLL WEEVIL DESTROYER.
APPLICATION FILED JULY 11, 1919.

1,323,016.

Patented Nov. 25, 1919.
2 SHEETS—SHEET 1.

Inventor
J. F. Cook

By D. Swift
His Attorney

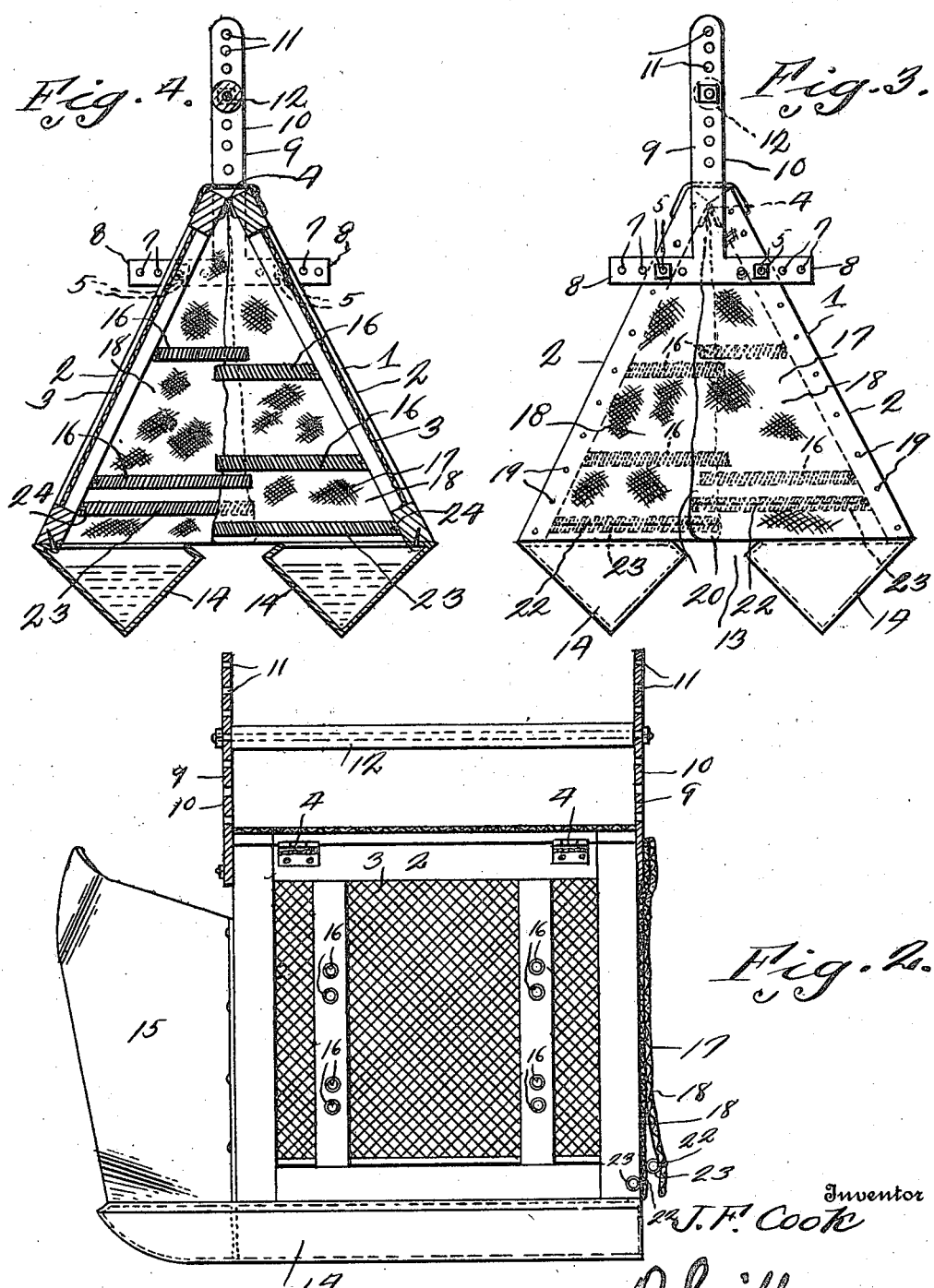

UNITED STATES PATENT OFFICE.

JESSE FRANKLIN COOK, OF MERIDIAN, MISSISSIPPI.

BOLL-WEEVIL DESTROYER.

1,323,016.  Specification of Letters Patent.  Patented Nov. 25, 1919.

Application filed July 11, 1919. Serial No. 310,235.

*To all whom it may concern:*

Be it known that I, JESSE FRANKLIN COOK, a citizen of the United States, residing at Meridian, in the county of Lauderdale, State of Mississippi, have invented a new and useful Boll-Weevil Destroyer; and I do hereby declare the following to be a full, clear, and exact description of the invention, such as will enable others skilled in the art to which it appertains to make and use the same.

The invention relates to boll weevil destroyers, and has for its object to provide a machine of this character which may be operated by hand, and provided with means whereby the sides forming the same may be adjusted to various positions so that plants of various sizes may be passed between said sides and the weevils dislodged from the same and deposited in liquid in troughs secured to the lower ends of said sides.

A further object is to provide a hand operated weevil destroyer comprising a pair of pivoted sides, and means for adjusting said sides in relation to each other so as to allow plants of different sizes and character and pass between said sides so that the weevils may be dislodged from the plants by contact with the series of flexible arms carried by the sides allowing the weevils to fall into liquid containers carried at the lower ends of the pivoted sides.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Fig. 2 is a longitudinal sectional view taken on line 2—2 of Fig. 1.

Fig. 3 is a rear view of the destroyer.

Fig. 4 is a sectional view taken on line 4—4 of Fig. 1.

Figure 1:
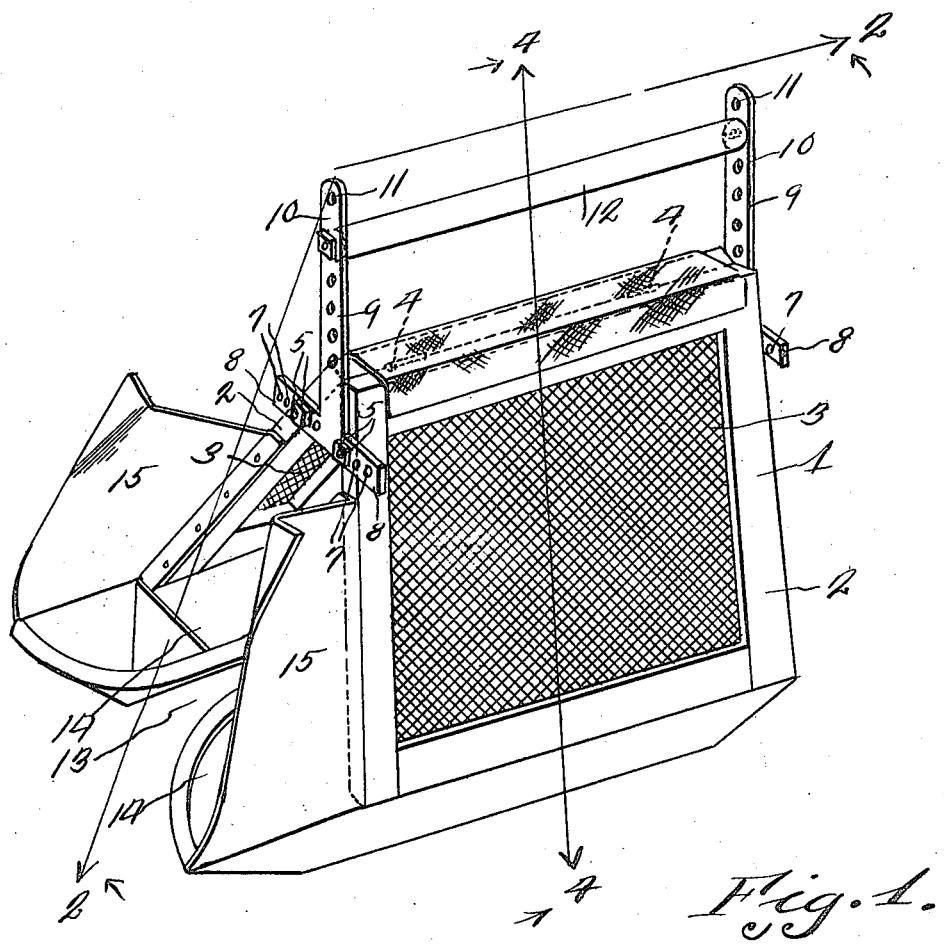
Figure 1 is a perspective view of the boll weevil destroyer.

Referring to the drawings the numeral 1 designates the body of the weevil destroyer, said body comprising the side members 2 which are provided with screening 3 if so desired, so that the interior of the destroyer may be observed by the operator. Side members 2 are hingedly connected at their upper edges as at 4. The lower end of the side members 2 may be swung outwardly from each other so as to accommodate the destroyer to various kinds and sizes of plants. However, after the sides have been adjusted in the proper relation to each other, they are maintained in said adjusted positions by means of studs and nuts 5, said studs being carried by the edges of the members 2 and are adapted to be passed through any of the apertures 7 in the arms 8 of the T-shaped brackets 9. The arms 10 of the T-shaped brackets are provided with a series of apertures 11 for the reception of the handle member 12, by means of which handle member, the destroyer is held suspended and passed along the plant rows, in such a position that the plants will enter the mouth 13 thereof between the troughs 14, which troughs are adapted to receive liquid, or a solution that will quickly kill the weevils.

Shields 15 are secured to the front edges of the members 2 and are adapted to guide the leaves and branches of the plants into position between the pivoted members 2.

Members 2 on their inner faces are provided with flexible arms 16, which arms are adapted to come in contact with the various branches and parts of the plant, and as the destroyer is moved along said arms will drag over the plants and cause a jarring or shaking action to be imparted to the same. This jarring or shaking action will cause the weevils to be dislodged from the plants and allowed to drop into the troughs 14. The rear end of the destroyer is provided with a closure 17 formed from triangular pieces of fabric 18, said fabric being secured as at 19 along one of its edges to the sides 2. The inner edges of the fabric are overlapped as at 20 and are stitched as at 22 to the springs 23, which springs are in turn secured to the sides 2 as at 24, thereby maintaining the triangular shaped fabric members 18 normally in overlapped position, but however, as a plant passes between the same the fabric will be maintained in close engagement with the sides of the plant, thereby dislodging weevils that may not have been dislodged by the flexible springs 16.

From the above it will be seen that a hand operated machine is provided, wherein, the weevils will be quickly and thoroughly removed from the plants, also one wherein the machine may be operated by one person.

The invention having been set forth what is claimed as new and useful is:—

A hand operated boll weevil destroyer, comprising a pair of pivoted members, said members having their upper edges hingedly secured together, liquid containers carried by the free ends of the pivoted members, means for adjusting the lower ends of the pivoted members inwardly and outwardly and comprising a T-shaped bracket, said T-shaped bracket being provided with apertures adapted to receive lugs carried by the ends of the sides of the pivoted members, one arm of said T-shaped brackets extending upwardly and provided with a series of apertures for the reception of the handle member so that the same may be adjusted upwardly or downwardly, flexible arms formed by coil springs secured to the inner faces of the pivoted members and adapted to engage the plants and a fabric plant engaging screen adapted to engage and drag over the plants as they pass rearwardly through the machine.

In testimony whereof I have signed my name to this specification.

JESSE FRANKLIN COOK.